US010210734B2

(12) United States Patent
Meyer

(10) Patent No.: US 10,210,734 B2
(45) Date of Patent: Feb. 19, 2019

(54) BASE STATION FOR CONNECTION WITH A SURFACE TREATMENT DEVICE, SYSTEM COMPRISED OF A SURFACE TREATMENT DEVICE AND BASE STATION, AND METHOD FOR OPERATING A BASE STATION

(71) Applicant: Vorwerk & Co. Interholding GmbH, Wuppertal (DE)

(72) Inventor: Frank Meyer, Iserlohn (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 15/749,236

(22) PCT Filed: Aug. 1, 2016

(86) PCT No.: PCT/EP2016/068300
§ 371 (c)(1),
(2) Date: Jan. 31, 2018

(87) PCT Pub. No.: WO2017/025370
PCT Pub. Date: Feb. 16, 2017

(65) Prior Publication Data
US 2018/0225943 A1    Aug. 9, 2018

(30) Foreign Application Priority Data

Aug. 7, 2015   (DE) .......................... 10 2015 113 035

(51) Int. Cl.
*G08B 17/107* (2006.01)
*G08B 17/103* (2006.01)
(Continued)

(52) U.S. Cl.
CPC ............ *G08B 17/107* (2013.01); *A47L 11/02* (2013.01); *A47L 11/40* (2013.01); *G08B 17/103* (2013.01);
(Continued)

(58) Field of Classification Search
CPC ........ G08B 17/107; A47L 11/02; A47L 11/40; A47L 2201/02; A47L 2201/04
(Continued)

(56) References Cited

U.S. PATENT DOCUMENTS

| 5,202,661 A | 4/1993 | Everett, Jr. et al. |
| 5,446,445 A | 8/1995 | Bloomfield et al. |

(Continued)

FOREIGN PATENT DOCUMENTS

| CN | 103142188 A | 6/2013 |
| DE | 10 2008 014 912 A1 | 9/2009 |

(Continued)

OTHER PUBLICATIONS

International Search Report of PCT/EP2016/068300, dated Oct. 24, 2016.

(Continued)

*Primary Examiner* — Ojiako K Nwugo
(74) *Attorney, Agent, or Firm* — Collard & Roe, P.C.

(57) ABSTRACT

A surface treatment device, in particular a cleaning robot, has at least one optical device element and an evaluation unit. The optical device element is configured such that light emitted by the optical device element is at least partially reflected to an optical device element by means of the external element. During an interaction of the optical device element and the external element for the purpose of detecting a presence of smoke between the optical device element and the external element, the evaluation unit evaluates a measurement signal received by the optical device element with respect to a temporal change in signal amplitude, and triggers an alarm signal when a defined threshold value has been passed.

10 Claims, 5 Drawing Sheets

(51) Int. Cl.
*A47L 11/02* (2006.01)
*A47L 11/40* (2006.01)
*G01S 17/48* (2006.01)
*G01S 17/93* (2006.01)

(52) U.S. Cl.
CPC ....... *A47L 2201/00* (2013.01); *A47L 2201/02* (2013.01); *A47L 2201/04* (2013.01); *G01S 17/48* (2013.01); *G01S 17/936* (2013.01)

(58) Field of Classification Search
USPC ........................................................ 340/628
See application file for complete search history.

(56) References Cited

U.S. PATENT DOCUMENTS

| | | | |
|---|---|---|---|
| 5,742,232 A | 4/1998 | Kurahashi et al. | |
| 5,831,528 A | 11/1998 | Cecic et al. | |
| 6,225,910 B1 | 5/2001 | Kadwell et al. | |
| 9,968,232 B2 | 5/2018 | Watanabe et al. | |
| 2005/0237189 A1 | 10/2005 | Tani | |
| 2006/0061478 A1 | 3/2006 | Kim | |
| 2017/0169682 A1* | 6/2017 | Bressanutti | G08B 17/113 |
| 2017/0370835 A1* | 12/2017 | Di Marco | G01N 21/474 |
| 2018/0084965 A1* | 3/2018 | Huang | A47L 11/4005 |

FOREIGN PATENT DOCUMENTS

| | | |
|---|---|---|
| EP | 2 423 893 A1 | 2/2012 |
| EP | 2 423 893 B1 | 4/2013 |
| JP | 2001-253319 A | 9/2001 |
| WO | 93/10513 A1 | 5/1993 |

OTHER PUBLICATIONS

International Search Report of PCT/EP2016/065690, dated Oct. 6, 2016.

* cited by examiner

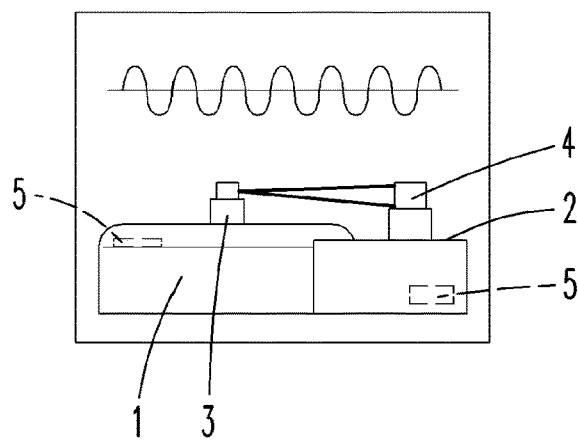
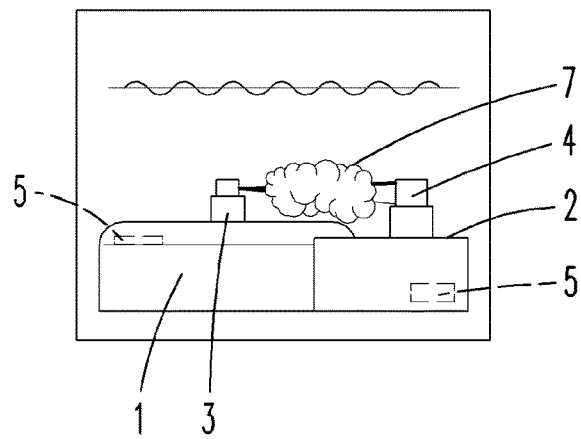
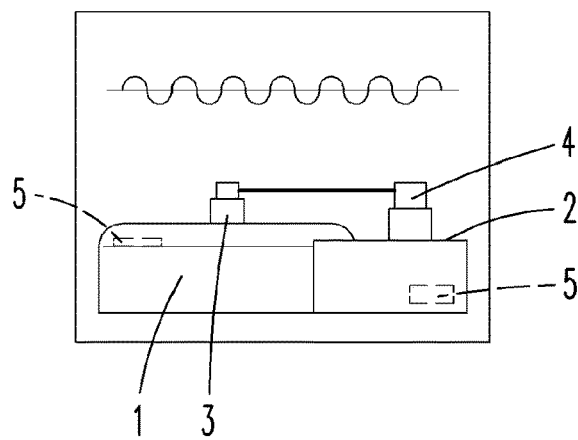

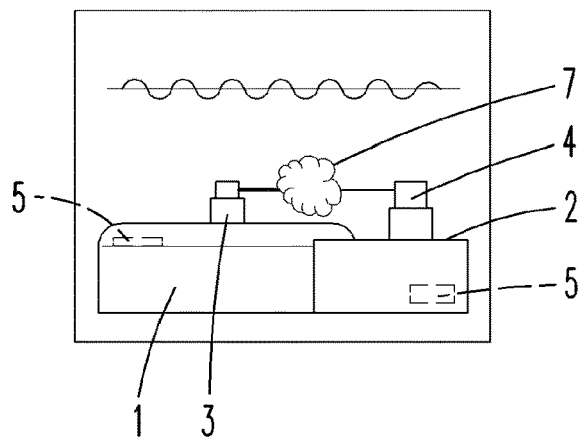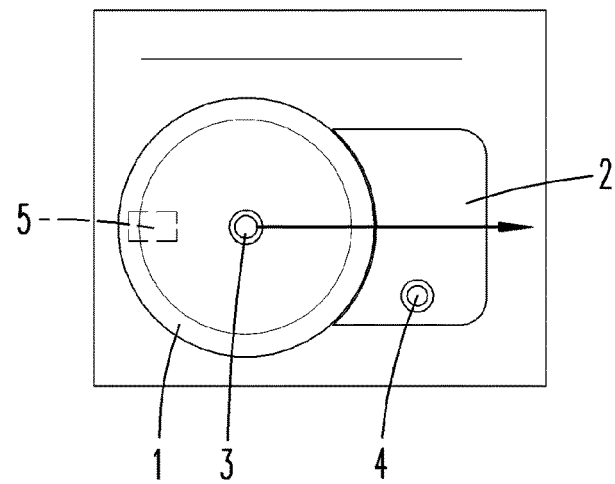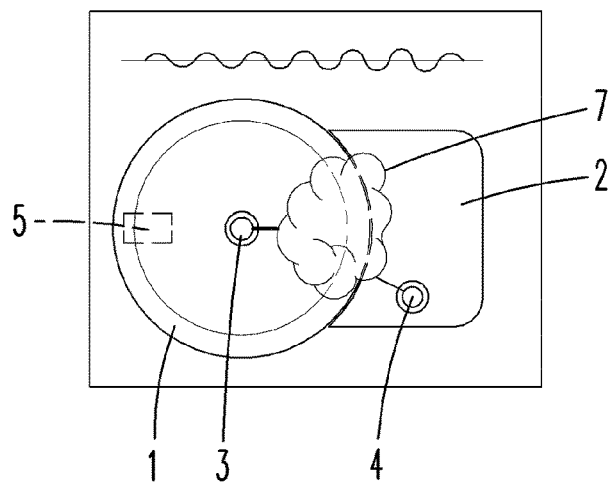

BASE STATION FOR CONNECTION WITH A SURFACE TREATMENT DEVICE, SYSTEM COMPRISED OF A SURFACE TREATMENT DEVICE AND BASE STATION, AND METHOD FOR OPERATING A BASE STATION

CROSS REFERENCE TO RELATED APPLICATIONS

This application is the National Stage of PCT/EP2016/068300 filed on Aug. 1, 2016, which claims priority under 35 U.S.C. § 119 of German Application No. 10 2015 113 035.1 filed on Aug. 7, 2015, the disclosures of which are incorporated by reference. The international application under PCT article 21(2) was not published in English.

AREA OF TECHNOLOGY

The invention initially relates to a base station for connection with a surface treatment device for servicing activities, in particular for cleaning the surface treatment device and/or charging an accumulator of the surface treatment device, wherein the base station has at least one optical base element and an evaluation unit.

The invention further relates to a system comprised of a surface treatment device, in particular a cleaning robot, and a base station as described above.

The invention further relates to a method for operating a base station.

PRIOR ART

Base stations for connection with a surface treatment device are sufficiently known in prior art. The surface treatment device can be connected with the base station, for example to empty and clean a dust chamber of the surface treatment device, charge an accumulator of the surface treatment device, or the like. For example, if the surface treatment device is a cleaning robot, in particular a wiping and/or vacuuming robot, it can be started by the base station independently, if needed. In other cases, a user can connect the surface treatment device with the base station manually, so as to perform the aforementioned servicing activities.

For example, the surface treatment device and base station have corresponding optical elements, which in the simplest case are designed to detect the presence of the surface treatment device on the base station or measure a distance between the surface treatment device and the base station. For example, one of the optical elements can also be part of a laser triangulation system of the surface treatment device.

For example, publication DE 10 2008 014 912 A1 discloses a surface treatment device with such an optical triangulation system, which provides several optical elements for obstacle detection. Among other things, the optical elements contain a light source and a sensor for the light beams reflected by a measured object.

Known from EP 2 423 893 A1 is a base station with an optical base element. The optical base element is an infrared receiver. As a result, the known base station is designed to receive information from the surface treatment device.

SUMMARY OF THE INVENTION

Proceeding from the described prior art, the object of the invention is to indicate a base station and/or a system comprised of a surface treatment device and a base station or a method for operating a base station that gives added value to a user through additional functionalities.

This object is initially achieved by a base station for connection with a surface treatment device for servicing activities, in particular for cleaning the surface treatment device and/or charging an accumulator of the surface treatment device, wherein the base station has at least one optical base element and an evaluation unit, with the aim being to design the optical base element for interacting with an external element in such a way that light emitted by the optical base element is reflected by means of the external element at least partially to the optical base element, wherein, while the optical base element and external element interact for purposes of detecting the presence of smoke between the optical base element and external element, the evaluation unit is designed to evaluate a measuring signal received from the optical base element for a change in the signal amplitude over time, and trigger an alarm signal once a defined threshold has been passed.

A surface treatment device can be designed as an optical device element for interacting with an external element in such a way that the light emitted by the optical device element is reflected by means of the external element at least or at least partially to the optical base element, wherein, while the optical base element and external element interact for purposes of detecting the presence of smoke between the optical base element and external element, the evaluation unit is designed to evaluate a measuring signal received from the optical base element for a change in the signal amplitude over time, and trigger an alarm signal once a defined threshold has been passed.

This object is further achieved by a system comprised of a surface treatment device and a base station, with the aim being to allocate to at least one optical element an evaluation unit, which, while the optical elements interact for purposes of detecting the presence of smoke between the optical device element and optical base element, is designed to evaluate a measuring signal received from the optical elements for a change in the signal amplitude over time, and trigger an alarm signal once a defined threshold has been passed, and to have the interaction between the optical elements take place given contact between the surface treatment device and base station, wherein the function as a smoke sensor can also be accompanied by the implementation of servicing activities of the base station, such as charging an accumulator or cleaning a dust chamber of the surface treatment device.

This object is also achieved in a method for operating a base station of the kind described above with the aim being to space the base element a distance apart for an interaction, wherein the optical base element emits light that is received by the optical base element, wherein an evaluation unit of the base station evaluates the measuring signal received by means of the optical base element for purposes of detecting the presence of smoke between the optical base element and external element for a change in signal amplitude over time, and triggers an alarm signal once a defined threshold has been passed.

The optical device elements of the surface treatment device and the external element can thus also comprise a smoke sensor, wherein the measuring signal received by one of the optical device elements is evaluated over a defined timespan, in particular continuously, by the evaluation unit, wherein the evaluation unit detects a change in signal amplitude, and given an excessive change as defined by a threshold, determines the presence of smoke between the optical device elements of the surface treatment device and the external element, and thereupon prompts an alarm system to output an alarm signal (fire alarm). Among other things, the device elements can in particular have at least one light source and one sensor. For example, the latter can also be connected to yield a shared transceiver unit. The external element is preferably a mirror, in the simplest case a surface that at least partially reflects the emitted light, for example a partial surface area of a wall or piece of furniture. The external element is preferably an optical base element of a base station, for example a partially reflective surface of the housing of the base station or also an optical mirror arranged inside of the housing. The light emitted by the optical device element is here reflected by means of the external element, i.e., the reflective surface or optical mirror, to another optical device element of the surface treatment device. In the absence of smoke, the optical device element preferably receives the radiated light of the light source nearly completely, but in the presence of smoke, it receives a measuring signal with a contrastingly diminished signal amplitude. A currently measured signal amplitude is here always compared with a reference signal amplitude common for the absence of smoke, wherein the presence of smoke is inferred when the value drops below a defined threshold. Based upon the detection result, the evaluation unit can then relay a signal to an alarm unit of the surface treatment device, a base station or also a home alarm system, whereupon the latter transmits an optical and/or acoustic alarm signal to the user of the surface treatment device, an emergency call center or the like.

It is proposed that the optical device element be a light source, preferably a diode, especially preferably a laser diode. It makes sense to use a diode or laser diode as the light source, since it can be easily integrated into an electric circuit, and is especially small and cost effective. Another advantage to the laser diode is the spatially coherent light emission, so that the emitted light is bundled even over greater distances and propagates without expanding, which could otherwise lead to a change in the signal amplitude measured by the sensor, and hence to a misinterpretation of the measuring signal.

It is proposed that the light source be an element of a distance measuring device, in particular a triangulation measuring device, of the surface treatment device. The light radiation required for detecting smoke can thus be emitted by a light source of the surface treatment device, which apart from that is also used to measure distance and/or detect obstacles. As a consequence, it is not necessary to arrange a separate light source on the surface treatment device to provide the smoke sensor. Rather, the light source of the surface treatment device, for example which is not required for measuring distance or measuring obstacles with the surface treatment device in the idle state, can be used for detecting smoke. Alternatively, a clocked, alternating use of the light source over time can be provided for smoke measurement and distance measurement/obstacle detection.

It is also proposed that the optical device element be a sensor, in particular a photodiode or a camera chip. Particularly suited as the sensor is a cost-effective, mass-produced component, for example a photodiode or camera chip. The latter can especially preferably be integrated into an electronic conductor structure of the surface treatment device.

Apart from the surface treatment device proposed above, the invention also proposes a base station of the aforementioned type, whose optical base element is designed to interact with an external element in such a way that light emitted by the optical base element is reflected by means of the external element at least partially to an optical base element, wherein, while the optical base element and external element interact for purposes of detecting the presence of smoke between the optical base element and external element, the evaluation unit is designed to evaluate a measuring signal received from the optical device element for a change in the signal amplitude over time, and trigger an alarm signal once a defined threshold has been passed.

The optical base elements of the base station and the external element together comprise a smoke sensor, wherein the measuring signal received by one of the optical base elements is evaluated by the evaluation unit over a defined timespan, in particular continuously, wherein the evaluation unit detects a change in signal amplitude, and given an excessive change as defined by a threshold, determines the presence of smoke between the optical base elements of the base station and the external element, and thereupon prompts an alarm system to output an alarm signal (fire alarm). The optical base elements are at least one light source and one sensor. The latter can be connected to yield a shared transceiver unit. The external element is preferably a mirror, in the simplest case a surface that at least partially reflects the emitted light, for example a partial surface area of a wall or piece of furniture. However, the external element can preferably also be an optical device element of a surface treatment device, for example a partially reflective surface of the housing of the surface treatment device or also an optical mirror arranged inside of the housing. The light emitted by the optical base element is here reflected by means of the external element, i.e., the reflective surface or optical mirror, to the additional optical base element. In the absence of smoke, the optical base element preferably receives the radiated light of the light source nearly completely, but in the presence of smoke, it receives a measuring signal with a contrastingly diminished signal amplitude. A currently measured signal amplitude is here always compared with a reference signal amplitude common for the absence of smoke, wherein the presence of smoke is inferred when the value drops below a defined threshold. Based upon the detection result, the evaluation unit can then relay a signal to an alarm unit of the base station, the surface treatment device or also a home alarm system, whereupon the latter transmits an optical and/or acoustic alarm signal to the user of the base station, an emergency call center or the like.

It is proposed that the optical base element be a light source, preferably a diode, especially preferably a laser diode. It makes sense to use a diode or laser diode as the light source, since it can be easily integrated into an electric circuit, and is especially small and cost effective. Another advantage to the laser diode is the spatially coherent light emission, so that the emitted light is bundled even over greater distances and propagates without expanding, which could otherwise lead to a change in the signal amplitude measured by the sensor, and hence to a misinterpretation of the measuring signal.

It is further proposed that the optical base element be a sensor, in particular a photodiode or a camera chip. Particularly suited as the sensor is a cost-effective, mass-produced component, for example a photodiode or camera chip. The latter can especially preferably be integrated into an electronic conductor structure of the base station.

With respect to the system comprised of a surface treatment device and a base station, the optical elements of the surface treatment device and base station comprise a smoke sensor, wherein the measuring signal received by one of the optical elements is evaluated over a defined timespan, in particular continuously, by the evaluation unit, wherein the evaluation unit detects a change in signal amplitude, and given an excessive change as defined by a threshold, determines the presence of smoke between the optical device element of the surface treatment device and the optical base element of the base station, and thereupon prompts an alarm system to output an alarm signal (fire alarm). Among other things, the optical elements can in particular have at least one light source, mirror and/or a sensor.

Various optical arrangements are basically possible for detecting the presence of smoke. In a first arrangement, a sensor receiving the measuring signal can be situated in the optical beam path of the light source (i.e., in the main propagation direction of light), for example, so that the sensor receives the light radiated by the light source directly and preferably completely in the absence of smoke, and in the presence of smoke, it receives a measuring signal with a contrastingly diminished signal amplitude. In a second arrangement, the sensor can be situated outside of the optical beam path of the radiation emitted by the light source, so as to measure scattered light outside of the optical beam path. The signal amplitude is usually zero in the absence of smoke (or other objects), while given the presence of smoke, the radiation emitted by the light source is scattered on the smoke (or on the smoke particles), and can hit the optical sensor(s). In both the first and second arrangements, a currently measured signal amplitude is here always compared with a reference signal amplitude common for the absence of smoke, wherein the presence of smoke is inferred if a value drops below (first arrangement) or rises above (second arrangement) a defined threshold. The evaluation unit can then relay a signal to an alarm unit of the surface treatment device, a base station or also a home alarm system, whereupon the latter transmits an optical and/or acoustic alarm signal to the user of the surface treatment device, an emergency call center or the like.

It is proposed that the optical elements be arranged on the surface treatment device and base station in such a way that a distance between the optical device element and optical base element measure roughly 1 cm to 20 cm during an interaction. On the one hand, this distance is measured in such a way as to leave enough of a distance between the optical element of the surface treatment device and optical element of the base station, into which smoke arising during a fire can penetrate. On the other hand, the distance is thus on an order of magnitude that ensures as loss-free as possible a transmission of the radiation emitted by a light source to another optical element, e.g., a sensor. In order to allow such a distance between the optical elements of the surface treatment device and the base station even given contact between the surface treatment device and base station, the optical elements are arranged accordingly on the surface treatment device or base station. An interaction between the optical elements can basically take place either given contact between the surface treatment device and base station, or given a distance between the surface treatment device and base station that corresponds to a position of the surface treatment device not located on the base station. For example, the surface treatment device can stand freely in front of the base station, i.e., not contact the base station, and thereby provide a distance of roughly 1 cm to cm between the optical component of the surface treatment device and the optical base element of the base station. However, it is advantageous that the surface treatment device be in contact with the base station while forming the advantageous distance, so that the function as a smoke sensor can be accompanied by the implementation of servicing activities, such as charging an accumulator or cleaning a dust chamber of the surface treatment device.

It is proposed that the optical device element or optical base element be a light source, preferably a diode, especially preferably a laser diode. It makes sense to use a diode or laser diode as the light source, since it can be easily integrated into an electric circuit, and is especially small and cost effective. Another advantage to the laser diode is the spatially coherent light emission, so that the emitted light is bundled even over greater distances and propagates without expanding, which could otherwise lead to a change in the signal amplitude measured by the sensor, and hence to a misinterpretation of the measuring signal.

The light source is advantageously an element of a distance measuring device, in particular a triangulation measuring device, of the surface treatment device. The distance measuring devices, in particular triangulation measuring devices, employed in surface treatment devices usually already utilize laser diodes, so that the aforementioned advantages can be achieved. The light radiation required for detecting the presence of smoke can basically be provided either by an optical element of the surface treatment device or by an optical element of the base station. However, use is especially preferably made of a light source of the surface treatment device which apart from that can also be used to measure distance and/or detect obstacles. As a consequence, it is not necessary to arrange a separate light source on the surface treatment device or base station to provide the smoke sensor configuration. Rather, the light source of the surface treatment device, which at times is not needed for distance measurement or obstacle detection, for example with the surface treatment device present in or on the base station, can be used for smoke detection.

Alternatively, however, the light source can also be an optical element of the base station, i.e., an optical base element, which corresponds with an optical element of the surface treatment device. In this case, light is not radiated from the surface treatment device, but rather from the base station. This can be especially advantageous, since the base station is usually a stationary device, which is connected to an electrical supply of a building, and need not be operated via an accumulator.

It is proposed that the optical base element or optical device element be a sensor, in particular a photodiode or camera chip. According to the invention, either the base station or the surface treatment device can thus have the sensor for detecting the signal amplitude. For example, it can be provided that the surface treatment device have a light source, and the base station a sensor, or vice versa, that the surface treatment device have the sensor and the base station the light source corresponding thereto. Particularly suited as the sensor is a cost-effective, mass-produced component, for example a photodiode or camera chip. The latter can especially preferably be integrated into an electronic conductor structure of the surface treatment device or base station.

It is further proposed that the optical base element or optical device element be a mirror for at least partially reflecting the light emitted by the optical device element or optical base element. In this case, either the surface treatment device or alternatively the base station has both the light source and the sensor. The light radiation emitted by the light source is here only reflected on the mirror of the base station or surface treatment device, so that the optical element in this case can be completely passive in design, and requires no power supply. For example, this is advantageous where active optical components (light source, sensor) are not to place an additional load on an accumulator. The mirror for reflecting the radiation can be a separate optical element of the surface treatment device or base station. Alternatively, however, a surface of the base station or surface treatment device can have a reflecting surface, in particular be coated with a reflective layer. It here goes without saying that the reflectance of the mirror surface corresponds to the wavelength of the emitted radiation.

The invention further also proposes a method for operating a surface treatment device and/or a base station, wherein at least one optical device element of the surface treatment device and/or at least one optical base element of the base station interact with each other and/or with an external element, wherein the optical elements are spaced a distance apart from each other for purposes of interacting, wherein the optical device element or the optical base element emits light, which is received by the optical base element or the optical device element, or reflected by the optical base element or optical device element or external element to the optical device element or optical base element, wherein an evaluation unit of the surface treatment device or base station evaluates the measuring signal received by means of the optical device element or optical base element for purposes of detecting the presence of smoke between the optical device element and optical base element, or between the external element and optical device element or optical base element for a change in the signal amplitude over time, and triggers an alarm signal once a defined threshold has been passed.

As a consequence, the method according to the invention (along with the aforementioned system) can be set to essentially two functionalities. In a first functionality, an optical element of the surface treatment device emits light, which is detected by an optical element of the base station or vice versa. In a second functionality, two optical elements both situated either on the surface treatment device or on the base station handle both emitting and detecting a light signal, while a corresponding optical element of the base station/surface treatment device or another external element acts only as a mirror, which reflects the light emitted by the optical element of the surface treatment device or base station back to an optical element of the surface treatment device or base station. The sensor is here advantageously arranged in proximity to the light source, so that the opposed light signals lie spatially close together.

BRIEF DESCRIPTION OF THE DRAWINGS

The invention will be described in more detail below based on exemplary embodiments. Shown on:

FIG. 6 is a system according to a second embodiment without the presence of smoke, FIG. 7 is the system according to FIG. 6 in the presence of smoke, FIG. 8 is a system according to a third embodiment without the presence of smoke, FIG. 9 is the system according to FIG. 8 in the presence of smoke, FIG. 10 is a system according to a fourth embodiment without the presence of smoke, FIG. 11 is the system according to FIG. 10 in the presence of smoke,

DESCRIPTION OF THE EMBODIMENTS

Figure 1:
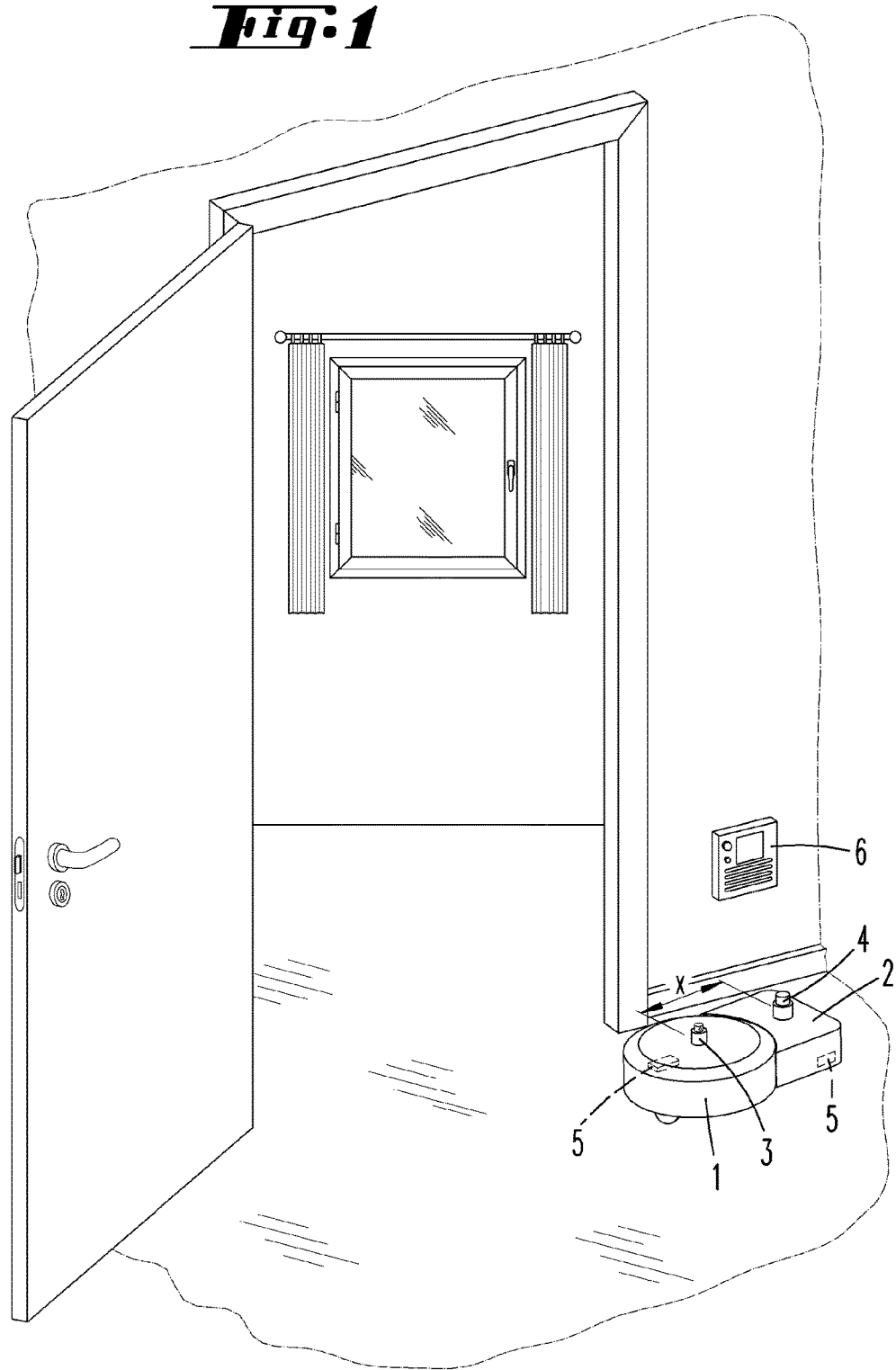
FIG. 1 is a system comprised of a surface treatment device and a base station in a room situation.

FIG. 1 shows a system comprised of a surface treatment device 1 and a base station 2, which is in a usual room situation. The surface treatment device 1 is here only exemplarily designed as a self-propelled cleaning robot. The base station 2 is not self-propelled, but can be freely placed inside of the room by a user of the system.

The surface treatment device 1 has an optical device element 3, which is arranged on the upper side of the surface treatment device 1, and an evaluation unit 5, which has a microprocessor and data memory. The base station 2 has an optical base element 4 and an evaluation unit 5, potentially along with additional components (not shown), for example which serve to charge an accumulator of the surface treatment device 1, clean a dust chamber of the surface treatment device 1 or the like.

In the illustration shown, the surface treatment device 1 is arranged in direct contact with the base station 2, i.e., connected with the base station 2. The surface treatment device 1 and base station 2 have correspondingly shaped partial housing areas, so that the surface treatment device 1 can move into a partial area of the base station 2. In this position, the optical elements 3, 4 are spaced a distance x apart from each other. While arranging the surface treatment device 1 on the base station 2, the surface treatment device 1 does not perform any surface treatment tasks. Rather, servicing activities are potentially performed on the surface treatment device 1 by means of the base station 2.

As explained below, the surface treatment device 1 and base station 2 in this position also interact as a smoke sensor (without it being ruled out that the system can also function as a smoke sensor with the surface treatment device 1 and base station 2 in a separated state).

For purposes of detecting the presence of smoke between the optical device element 3 and optical base element in the smoke sensor function, a light signal emitted by one of the optical elements 3, 4 is received by another optical element 3, 4, and evaluated by an evaluation unit 5 of the surface treatment device 1 and/or base station 2 for a change in signal amplitude (or light intensity) over time. A value that rises above or drops below a defined threshold triggers an alarm signal, which indicates the presence of smoke, i.e., in particular the occurrence of a home fire. The optical element 3, 4, which serves as a sensor, continuously receives a measuring signal and continuously compares it with a threshold stored in a data memory, so that the presence of smoke can be determined without any significant time delay. Yet another alarm system 6 is here located in one of the rooms, which is designed to communicate with the evaluation unit 5 of the surface treatment device 1 or base station 2, and can relay the alarm system to an external emergency call center, a mobile device of the user or the like.

Figure 2:
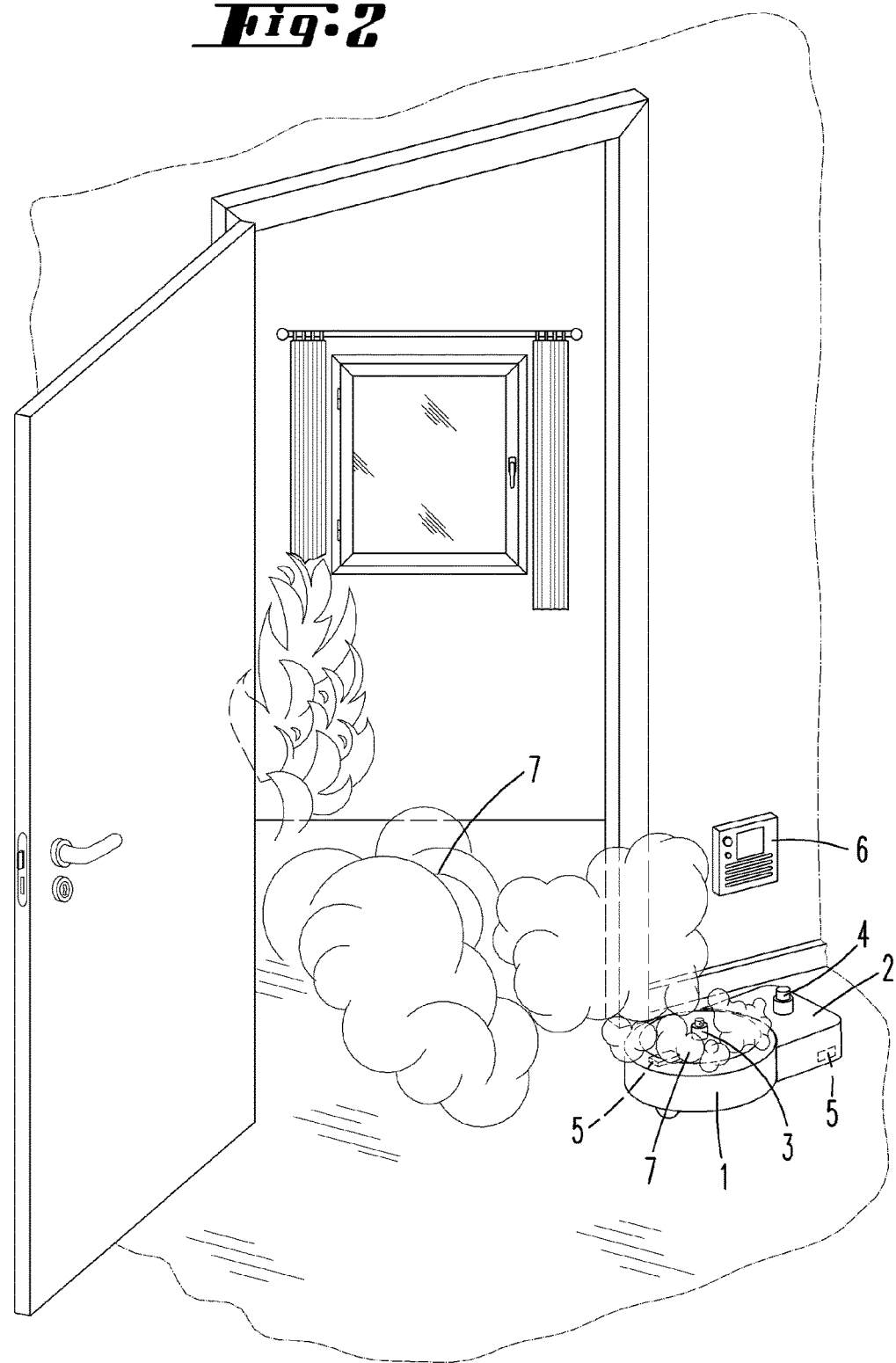
FIG. 2 is the room situation according to FIG. 1 with smoke developing due to fire.

FIG. 2 shows the room situation described above when a fire has broken out inside of a room. Smoke here develops 7, i.e., smoke is present inside of the rooms. The smoke 7 also reaches the site at which the inventive system comprised of the surface treatment device 1 and base station 2 is located. The smoke 7 penetrates at least partially between the optical device element 3 of the surface treatment device 1 and the optical base element 4 of the base station 2, which are here spaced apart from each other by a distance x of approx. 20 cm.

Figure 3:
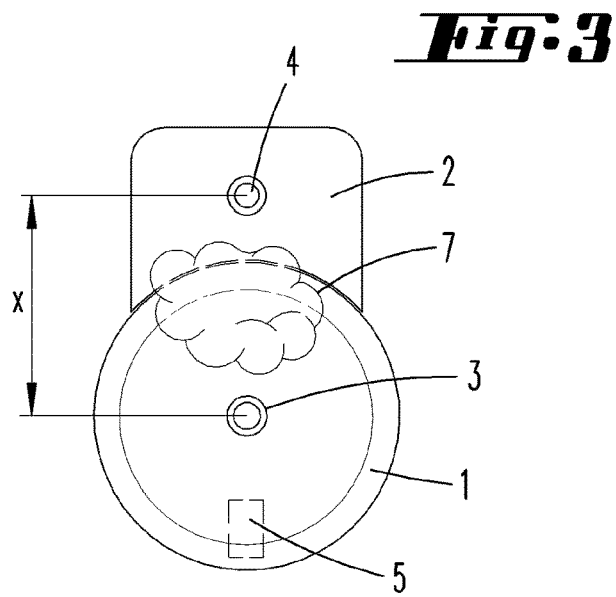
FIG. 3 is a top view of the system according to the invention.

FIG. 3 presents a top view of the system comprised of a surface treatment device 1 and base station 2. Visible is the correspondingly shaped configuration of a partial housing area of the surface treatment device 1 and a partial housing area of the base station 2.

Three different embodiments for the system comprised of a surface treatment device 1 and base station 2 will now be introduced below.

Figure 4:
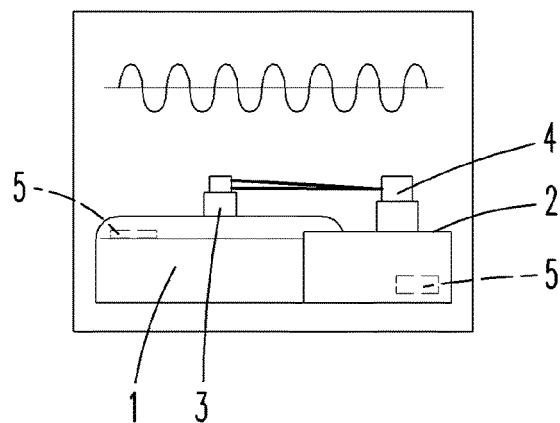
FIG. 4 is a schematic view of a system according to a first embodiment without the presence of smoke.
Figure 5:
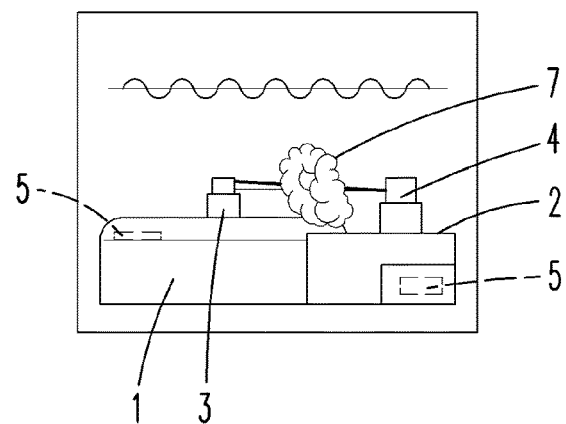
FIG. 5 is the system according to FIG. 4 in the presence of smoke.

FIGS. 4 and 5 show a first embodiment of the invention, in which the surface treatment device 1 has two optical device elements 3, specifically a light source and an optical sensor. The base station 2 has an optical element 4, which here is an optical mirror. The functionality in this embodiment variant is such that the light source of the surface treatment device 1 continuously emits a light signal, which is directed at the mirror of the base station 2. The light is reflected back by the mirror, and hits the sensor of the surface treatment device 1. The signal amplitude of the signal received by the sensor is schematically depicted on the figure. FIG. 5 shows the system on FIG. 4 in a situation in which smoke 7 is present in the optical beam path between the optical device elements 3 of the surface treatment device 1 and the optical base element 4 of the base station 2. In this situation, the light emitted by the light source of the surface treatment device 1 is at least partially scattered by the smoke 7, so that the corresponding light component can no longer get to the optical base element 4 of the base station 2. Therefore, the mirror reflects a light component with a lower signal amplitude by comparison to a situation in which no smoke 7 is present. In addition, this reflected light component in turn also hits the smoke 7 and is scattered a second time, so that the signal amplitude measured by the sensor of the surface treatment device 1 is lower overall than the signal amplitude measured in the situation according to FIG. 4. During the measuring process, the sensor of the surface treatment device 1 continuously relays information about the signal amplitude to the evaluation unit 5 of the surface treatment device 1. The evaluation unit 5 compares this signal amplitude with a reference signal amplitude, which essentially corresponds to the signal amplitude of the light signal emitted by the light source. If the signal amplitude currently measured by the sensor drops below the reference signal amplitude by a specific percentage (threshold), the presence of smoke 7 is inferred. For example, the defined threshold can be 10 percent lower than the reference signal amplitude that can be measured in the absence of smoke 7. When this defined threshold is dropped below, the evaluation unit 5 sends information to the alarm system 6, which thereupon emits an alarm signal. This alarm signal can be an optical and/or acoustic signal. An emergency call center can advantageously also be informed about the fire.

FIGS. 6 and 7 shows a second embodiment of the invention, in which the surface treatment device 1 only has a single optical device element 3, and in which the base station 2 has two optical base elements 4. The two optical base elements 4 are a light source and a light sensor. The optical device element 3 is a mirror allocated to the surface treatment device 1. Apart from that, the invention in this second embodiment functions similarly to the embodiment according to FIGS. 4 and 5.

Even if this is not explicitly described as another embodiment, it goes without saying that, similarly to the embodiments illustrated on FIGS. 4 to 7, an external element such as a reflecting partial surface area of a wall, piece of furniture or the like can also be used as a mirror or reflecting surface. The optical device elements 3 of the surface treatment device 1 or the optical base elements 4 of the base station 2 can then interact with this partial surface area, so that the surface treatment device 1 according to FIGS. 4 and 5 can work as a smoke sensor even without the base station 2, or the base station 2 according to FIGS. 6 and 7 can work as a smoke sensor even without the surface treatment device 1.

FIGS. 8 and 9 present a third embodiment of the invention, in which the surface treatment device 1 has an optical device element 3, namely a light source, and the base station 2 has an optical base element 4, namely a sensor. The light emitted by the light source of the surface treatment device 1 is thus detected by the sensor of the base station 2. Without the presence of smoke 7 between the light source and sensor, the measuring signal of the sensor has the signal amplitude shown on FIG. 8. FIG. 9 depicts the situation given the presence of smoke 7 between the light source and sensor. The light emitted by the light source is here scattered on the smoke 7, and only a slight portion thereof can still get to the sensor of the base station 2. The signal amplitude of the measuring signal is thus lower than the reference signal amplitude without the presence of smoke 7. The diminished signal amplitude is shown on FIG. 9. The evaluation unit 5 of the base station 2 allocated to the sensor compares the current signal amplitude with the stored reference signal amplitude, and can infer the presence of smoke 7 if a defined threshold has been dropped below. Otherwise, an alarm signal is also triggered.

Finally, FIGS. 10 and 11 present a fourth embodiment of the invention, in which the base station 2 only has an optical base element 4, namely a sensor, which due to its position can only detect a signal given the presence of smoke 7 between the light source of the surface treatment device 1 and the sensor. In this embodiment, the sensor is arranged outside of the optical axis of the light emitted by the light source, so that it cannot receive a light component without the presence of smoke 7 (FIG. 10), and in the presence of smoke 7 receives a scattered light component whose signal amplitude is unequal to zero (FIG. 11). In the process, of course, light is not only scattered in the direction of the sensor, but rather diffusely radiated. The functionality is here based on the fact that, due to its position outside of the optical axis, the sensor can only receive the light of the light source if it is scattered on smoke proceeding from the light source, and thus gets in the direction of the sensor. As a consequence, the signal amplitude of the measuring signal is usually zero, i.e., in the absence of smoke 7, while the signal amplitude has a value unequal to zero in the presence of smoke 7, which is recognized as the presence of smoke 7 if a defined threshold is exceeded. An alarm is then triggered as described previously.

REFERENCE LIST

1 Surface treatment device
2 Base station
3 Optical device element
4 Optical base element
5 Evaluation device
6 Alarm system
7 Smoke
x Distance

The invention claimed is:

1. A base station for connection with a surface treatment device for servicing activities, wherein the base station has at least one optical base element and an evaluation unit, wherein the optical base element is designed to interact with an external element in such a way that light emitted by the optical base element is at least partially reflected to the optical base element by the external element, wherein, while the optical base element and external element interact for purposes of detecting the presence of smoke between the optical base element and external element, the evaluation unit is designed to evaluate a measuring signal received from the optical base element for a change in the signal amplitude over time, and trigger an alarm signal once a defined threshold has been passed.

2. The base station according to claim 1, wherein several optical base elements are provided.

3. The base station according to claim 2, wherein the optical base element has a diode.

4. The base station according to claim 2, wherein the sensor is a photodiode or a camera chip.

5. The system according to claim 4, wherein the optical base element or optical device element is a mirror for at least partially reflecting the light emitted by the optical device element or optical base element.

6. A system comprised of a surface treatment device, and a base station for connection with the surface treatment device for servicing activities, wherein the surface treatment device has at least one optical device element, and wherein the base station has at least one optical base element designed to interact with the optical device element, wherein an evaluation unit is allocated to the at least one optical element, and, while the optical elements interact for purposes of detecting the presence of smoke between the optical device element and optical base element, is designed to evaluate a measuring signal received from the optical elements for a change in the signal amplitude over time, and trigger an alarm signal once a defined threshold has been passed, and wherein an interaction between the optical elements takes place upon contact between the surface treatment device and base station, wherein a function as a smoke sensor can also be simultaneously accompanied by implementation of servicing activities for the base station.

7. The system according to claim 6, wherein the optical elements are arranged on the surface treatment device and base station in such a way that a distance between the optical device element and optical base element measures roughly 1 cm to 20 cm during an interaction.

8. The system according to claim 6, wherein the optical device element or optical base element is a light source.

9. The system according to claim 6, wherein the optical base element or optical device element is a sensor.

10. A method for operating a base station described in claim 1, wherein at least one optical base element of the base station interacts with an external element, wherein the optical base element is spaced a distance apart for an interaction, wherein the optical base element emits light, which is received by the optical base element, wherein an evaluation unit of the base station evaluates the measuring signal received by means of the optical base element for purposes of detecting the presence of smoke between the optical base element and external element for a change in the signal amplitude over time, and triggers an alarm signal once a defined threshold has been passed.

* * * * *